(12) United States Patent
Xue et al.

(10) Patent No.: US 11,814,573 B2
(45) Date of Patent: Nov. 14, 2023

(54) THERMOPLASTIC ELASTOMER FOR PROFILE CONTROL AND WATER SHUTOFF AND METHOD FOR PREPARING SAME

(71) Applicant: Southwest Petroleum University, Chengdu (CN)

(72) Inventors: Yan Xue, Chengdu (SC); Chunquan Zhang, Chengdu (CN); Dan Huang, Chengdu (CN); Liang Li, Chengdu (CN); Bing Wei, Chengdu (CN)

( * ) Notice: Subject to any disclaimer, the term of this patent is extended or adjusted under 35 U.S.C. 154(b) by 224 days.

(21) Appl. No.: 17/382,348

(22) Filed: Jul. 22, 2021

(65) Prior Publication Data
US 2022/0089935 A1    Mar. 24, 2022

(30) Foreign Application Priority Data

Sep. 22, 2020   (CN) .......................... 2020110044158

(51) Int. Cl.
| C09K 8/508 | (2006.01) |
| C09K 8/504 | (2006.01) |
| C08F 8/28  | (2006.01) |

(52) U.S. Cl.
CPC .............. *C09K 8/5083* (2013.01); *C08F 8/28* (2013.01); *C09K 8/5045* (2013.01)

(58) Field of Classification Search
None
See application file for complete search history.

(56) References Cited

U.S. PATENT DOCUMENTS

| 7,270,879 B2* | 9/2007 | McCrary | C09K 8/805 428/404 |
| 10,633,485 B2* | 4/2020 | Cochran | C08F 122/1006 |
| 2013/0157901 A1* | 6/2013 | Ogle | C09K 8/68 507/224 |
| 2015/0337078 A1* | 11/2015 | Cochran | C08F 122/1006 525/190 |
| 2016/0230494 A1* | 8/2016 | Fripp | E21B 33/12 |
| 2016/0290090 A1* | 10/2016 | Murphree | E21B 43/26 |

* cited by examiner

*Primary Examiner* — John J Figueroa

(57) ABSTRACT

A thermoplastic elastomer for profile control and water shutoff is prepared from the following raw materials in parts by weight: 8-10 parts of a component A, 1-3 parts of a strong acid, 1-3 parts of a hydrophobic modifier and 100-105 parts of water. The component A is one of polyethylene glycol, polyvinylether, polyvinyl alcohol, copolymer of acrylamide and acrylonitrile. The strong acid is one of concentrated hydrochloric acid and concentrated sulfuric acid. The hydrophobic modifier is any one of formaldehyde, acetaldehyde, propionaldehyde, butyraldehyde, β-propiolactone, γ-butyrolactone, δ-valerolactone, methyltriacetylsilane, methyltrimethylsilane, butyl acrylate and ethylene glycol dimethacrylate. The thermoplastic elastomer for profile control and water shutoff provided by the disclosure has the advantages of one-step preparation and molding, strong deformation capability, temperature resistance, salt tolerance, strong stability and the like, and is suitable for large-scale production and application.

8 Claims, 3 Drawing Sheets

THERMOPLASTIC ELASTOMER FOR PROFILE CONTROL AND WATER SHUTOFF AND METHOD FOR PREPARING SAME

CROSS REFERENCE TO RELATED APPLICATION

This patent application claims the benefit and priority of Chinese Patent Application No. 202011004415.8 filed on Sep. 22, 2020, the disclosure of which is incorporated by reference herein in its entirety as part of the present application.

TECHNICAL FIELD

The present disclosure relates to the technical field of oil field chemical water shutoff and profile control agent, and more specifically, to a thermoplastic elastomer for profile control and water shutoff and a method for preparing the thermoplastic elastomer.

BACKGROUND ART

With the development of long-term water flooding, the average water cut of oil wells in China has exceeded 80%, and the water cut of some oil wells has even reached above 90%. Due to the continuous formation of optimal permeability passage of injected water in oil reservoir and the serious problem of oil well effluent, many problems such as low control degree of water injection well, reduced oil recovery, serious scaling and corrosion of pipeline and increased environmental pollution are caused, which seriously restrict the high-efficiency development of oil field. Therefore, more efficient and high-quality oil field chemical water shutoff and profile control agents are needed to be researched.

After several decades of development, the oil field chemical water shutoff technology at home and abroad developed from the initial cement slurry water shutoff to resin water shutoff and profile control, then to the present water shutoff agent mainstream water-soluble polymer gel water shutoff agent. The oil field water shutoff agent varieties are becoming more and more diversified. Among them, the flexible granular profile control and water shutoff agent has the characteristics of strong deformation ability, temperature resistance, salt tolerance and long-term stability, and can effectively adapt to the pore change of oil-using formation. Most of the traditional thermoplastic elastomer materials are in the form of blocks, which involves a granulation process, but the thermoplastic elastomer particles developed the present disclosure can be formed once. The intermediate granulation process is omitted, and the preparation steps are simplified. Therefore, it will be widely used in oil fields.

The patent CN102504774A discloses a flexible particle which improves the salt tolerance and temperature resistance of a polymer by increasing the steric hindrance effect and the rigidity of a polymer main chain, and meanwhile introduces a special copolymer to control the crosslinking degree and improve the chemical stability of the particle. Although the flexible particles are very good in temperature resistance, the preparation process is complex, the raw materials are flammable, toxic, chemical and corrosive, and are poor in environmental protection property. The preparation process is violently exothermic and the operation is dangerous. The polymerization process is not easy to control. The molecular weight distribution range of the polymerization product is wide, and therefore, the method is not suitable for mass production.

The patent CN106566501A discloses a polymer particle, which is a flexible polymer particle with strong deformability, temperature resistance and salt tolerance and long-term stability. The flexible polymer particle can effectively adapt to the pore change of an oil stratum under the conditions higher than the critical pressure difference, and deforms itself through the formation throat. The preparation raw materials are toxic. Organic solvent polymerization thereof involves the steps of aromatic monomer preparation, comonomer and initiation system screening, polymerization, granulation and the like. The preparation process is complex and complicated. The flexible water shutoff agent needs to be dissolved by toluene, and the application method is complex.

The patent CN106566501A discloses a flexible water shutoff agent, which reduces the production operation cost of an oil well and improves the economic benefit of oil and gas development. The flexible water shutoff agent mainly includes a structure forming agent, an active nano reinforcing agent, an active nano material, a gelling binding agent, an organic high-molecular polymer and a temperature regulator. More raw materials are required and the technological process is complex. Therefore, the cost is high.

Thermoplastic elastomer (TPE) is a kind of polymer material that shows the high elasticity of vulcanized rubber at normal temperature, and is easy to be processed and molded like thermoplastics at high temperature, which combines the properties of vulcanized rubber and thermoplastics. With excellent impact resistance, flexibility and flexing properties, the TPE is widely used in many industries such as automobiles, construction, household equipment, wires and cables, electronic products, food packaging, and medical equipment. However, the TPE particles have not yet been involved in the field of oilfield development, because most of the TPE materials synthesized by traditional techniques are block-shaped, and subsequent granulation processes are required to be applied to the oilfield, and the steps are cumbersome.

Therefore, it is an urgent problem for those skilled in the art to develop a thermoplastic elastomer for profile control and water shutoff with high deformation ability, temperature resistance and salt tolerance, long-term stability and simple preparation process.

SUMMARY

In view of the above, the present disclosure provides a thermoplastic elastomer for profile control and water shutoff and a method for preparing the thermoplastic elastomer.

In order to achieve the above object, the present disclosure adopts the following technical scheme.

A thermoplastic elastomer for profile control and water shutoff is prepared from the following raw materials in parts by weight: 8-10 parts of a component A, 1-3 parts of a strong acid, 1-3 parts of a hydrophobic modifier, and 100-105 parts of water.

The component A is one of a polyethylene glycol, a polyvinyl methyl ether, a polyvinyl alcohol and a copolymer of acrylamide and acrylonitrile.

The strong acid is one of a concentrated hydrochloric acid and a concentrated sulfuric acid.

The hydrophobic modifier is one of a formaldehyde, an acetaldehyde, a propionaldehyde, a butyraldehyde, a β-propiolactone, a γ-butyrolactone, a δ-valerolactone, a methyltriacetylsilane, a methyltrimethylsilane, a butyl acrylate, and an ethylene glycol dimethacrylate.

The method for preparing the copolymer of acrylamide and acrylonitrile is as follows: uniformly mixing acrylamide, acrylonitrile, ammonium persulfate and water according to the ratio of 9:1:0.05:100, heating and reacting for 2 hours under the protection of nitrogen, filtering, washing with deionized water, and drying to obtain the copolymer of the acrylamide and the acrylonitrile.

The present disclosure also provides a method for preparing a thermoplastic elastomer for profile control and water shutoff. The method includes:
(1) weighing raw materials according to the above-mentioned thermoplastic elastomer for profile control and water shutoff;
(2) dividing the water into two parts, adding the component A into the first part of water, heating and stirring to prepare a solution, and cooling;
(3) dripping the strong acid into the cooled solution;
(4) dripping a second part of water and a hydrophobic modifier to the solution in sequence, heating and stirring after the dripping to obtain the thermoplastic elastomer.

Further, in the above step (2), the weight ratio of the first part of water to the second part of water is 25-75:1.

Further, in the above step (2), the heating temperature is 90-100° C., the stirring rotation speed is 100-500 r/min, and the stirring time is 1-3 h.

By adopting the above scheme, the beneficial effect is: a homogeneous solution of component A can be obtained with the above process parameters.

Further, in the above step (2), the solution is cooled to 20-40° C.

By adopting the above solution, the further beneficial effect is: a suitable temperature is reduced to provide mild reaction conditions.

Further, in the above step (3), the dripping speed of the strong acid is 5-10 s/drop.

By adopting the above scheme, the further beneficial effect is: suitable acidity provides catalysis for hydrophobic modification reactions.

Further, in the above step (4), the heating temperature is 25-40° C., the stirring rotation speed is 500-1000 r/min, and the stirring time is 1-5 h.

Further, in the above step (4), the second part of water and the hydrophobic modifier are dripped to the solution in sequence, and after the dripping, the solution is stirred at a temperature of 25° C. for 0-1 h, then heated to 30° C., stirred for 0-1 h, and finally heated to 40° C. and stirred for 1-3 h to obtain the thermoplastic elastomer.

By adopting the above solution, further beneficial effect is: setting the temperature gradient not only ensures that the reaction is sufficient and does not burst, but also shortens the reaction time.

Further, in the above step (4), the dripping speed of the second part of water is 5-15 s/drop; the dripping speed of the hydrophobic modifier is 5-15 s/drop.

By adopting the above further beneficial effects: the one-time forming of the particles is ensured by dripping the hydrophobic modifier.

The beneficial effects of the present disclosure are: the present disclosure directly prepares thermoplastic elastomer particles through the dropwise addition method, realizing the modification-crosslinking-granulation of the plugging agent material "in one step", greatly simplifying the process steps and reducing the production cost, the synthesis can be formed in the water phase at one time, and therefore the method has the characteristics of green economy and lower cost. The adjustment of the product particle size can be achieved by changing the temperature, material ratio, stirring speed and the like, which can be used for deep flow diversion in high water-cut oil fields to improve the displacement effect of water flooding, polymer flooding, surfactant flooding, and combined flooding , and enhance the oil reservoir recovery. At high temperatures, the plugging agent particles will stick, stay and accumulate in the porous medium, block the porous medium, force the water flow to change the flow direction, prevent the flow from the dominant channel, and expand the volume of water injection. The thermoplastic elastomer for profile control and water shutoff of the present disclosure has the advantages of strong deformation ability, temperature resistance, salt tolerance, high stability and the like.

Figure 3:
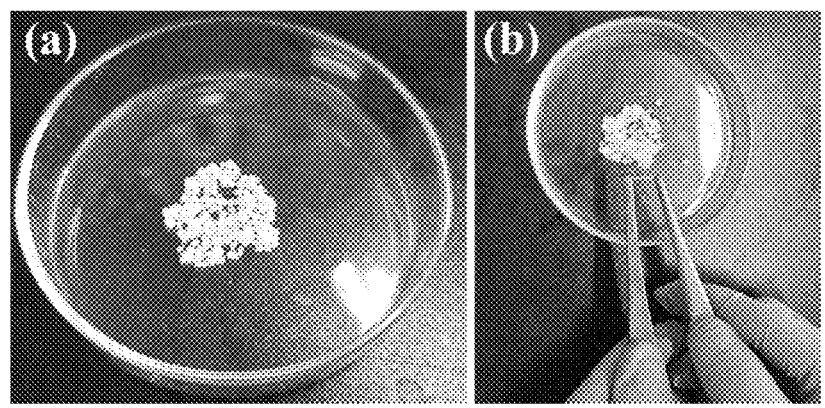

Wherein, AHM-15: 15° C. synthetic thermoplastic elastomer;

AHM-30: 30° C. synthetic thermoplastic elastomer;

AHM-40: 40° C. synthetic thermoplastic elastomer;

FIG. 3 is a graph of AHM thermoplastic elastomer particles;

Wherein, (a) is an apparent graph of AHM thermoplastic elastomer particles and (b) is a graph after stretching.

DETAILED DESCRIPTION OF THE EMBODIMENTS

The technical solutions in the embodiments of the present disclosure will be described clearly and completely in the following, and it is obvious that the described embodiments are only a part of the embodiments of the present disclosure, but not all of the embodiments. Based on the embodiments of the present disclosure, all other embodiments obtained by a person of ordinary skill in the art without involving any inventive effort are within the scope of the present disclosure.

Embodiment 1

The method for preparing the thermoplastic elastomer for profile control and water shutoff. The method includes:
(1) weighing 8 g of polyethylene glycol, 1 g of formaldehyde, and 1 g of concentrated hydrochloric acid with a volume concentration of 36%;
(2) adding the polyethylene glycol into 100 g of water, heating and stirring to obtain a solution, the heating temperature is 90° C., the stirring rotation speed is 100 r/min, the stirring time is 1 h, and the solution is cooled to 20° C.;
(3) dripping the concentrated hydrochloric acid into the cooled solution at a dripping speed of 5 s/drop.
(4) dripping 2 g of water and formaldehyde into the solution in sequence, the dripping speed of the second part of water is 5 s/drop; the dripping speed of formaldehyde is 5 s/drop, and after the dripping, the solution is stirred at the temperature of 25° C. for 0.5 h, then heated to 30° C. and stirred for 0.5 h, and finally heated to 40° C. and stirred for 1 hour to obtain the thermoplastic elastomer.

Embodiment 2

The method for preparing the thermoplastic elastomer for profile control and water shutoff. The method includes:
(1) weighing 9 g of polyvinyl methyl ether, 2 g of β-propiolactone, and 2 g of concentrated sulfuric acid with a volume concentration of 98%;
(2) adding polyvinyl methyl ether into 100 g of water, heating and stirring to obtain a solution, the heating temperature is 95° C., the stirring rotation speed is 300 r/min, the stirring time is 2 h, and the solution is cooled to 30° C.;
(3) dripping the concentrated sulfuric acid into the solution at a dripping speed of 7 s/drop.
(4) dripping 2 g of water and β-propiolactone into the solution in sequence, the dripping speed of the second part of water is 10 s/drop; the dripping speed of β-propiolactone is 10 s/drop, and after the dripping, the solution is stirred at the temperature of 25° C. for 1 h, then heated to 30° C. and stirred for 1 h, and finally heated to 40° C. and stirred for 2 h to obtain the thermoplastic elastomer.

Embodiment 3

The method for preparing the thermoplastic elastomer for profile control and water shutoff. The method includes:
(1) weighing 10 g of polyvinyl alcohol, 3 g of methyl triacetyl silane, and 3 g of concentrated sulfuric acid with a volume concentration of 95%;
(2) adding the polyvinyl alcohol into 100 g of water, heating and stirring to obtain a solution, the heating temperature is 95° C., the stirring rotation speed is 500 r/min, the stirring time is 2 h, and the solution is cooled to 30° C.;
(3) dripping the concentrated sulfuric acid into the solution at a dripping speed of 10 s/drop.
(4) dripping 2 g of water and methyl triacetyl silane into the solution in sequence, the dripping speed of the second part of water is 15 s/drop; the dripping speed of methyl triacetyl silane is 15 s/drop, and after the dripping, the solution is stirred at the temperature of 30° C. for 1 h, then heated to 40° C. and stirred for 3 h to obtain the thermoplastic elastomer.

Embodiment 4

The method for preparing the thermoplastic elastomer for profile control and water shutoff. The method includes:
(1) weighing 10 g of copolymer of polyacrylamide and acrylonitrile, 3 g of butyl acrylate, and 3 g of concentrated sulfuric acid with a volume concentration of 96%;
(2) adding copolymer of polyacrylamide and acrylonitrile into 100 g of water, heating and stirring to obtain a solution, the heating temperature is 95° C., the stirring rotation speed is 500 r/min, the stirring time is 2 h, and the solution is cooled to 30° C.;
(3) dripping concentrated hydrochloric acid into the cooled solution at a dripping speed of 10 s/drop.
(4) dripping 2 g of water and butyl acrylate into the solution in sequence, the dripping speed of the second part of water is 15 s/drop; the dripping speed of butyl acrylate is 15 s/drop, and after the dripping, the solution is stirred at the temperature of 30° C. for 1 h, then heated to 40° C. and stirred for 3 h to obtain the thermoplastic elastomer.

Experiments for Testing the Effects

1. Temperature Resistance and Salt Tolerance of the Thermoplastic Elastomer for Profile Control and Water Shutoff Provided by the Present Disclosure The thermoplastic elastomers prepared in the embodiments 1-4 were respectively placed in pure water and 210,000 salinity salt water, and then placed in oven at 80° C., 100° C. and 110° C., respectively. After 90 hours, the thermoplastic elastomer particles in pure water were bonded at the temperature of 110° C., but can still be separated after being taken out, and the thermoplastic elastomer particles were not bonded under other conditions, so that the thermoplastic elastomer for profile control and water shutoff has excellent temperature resistance and salt tolerance.

2. Water Absorption of the Thermoplastic Elastomer for Profile Control and Water Shutoff Provided by the Present Disclosure Taking the thermoplastic elastomer prepared in the embodiments 1-4, freeze-drying the thermoplastic elastomer, placing the thermoplastic elastomer in normal temperature water for three days without substantially absorbing water, directly soaking the thermoplastic elastomer in 90° C. water, basically recovering the original particle size after absorbing water for two days, and having better water absorption performance.

Figure 1:
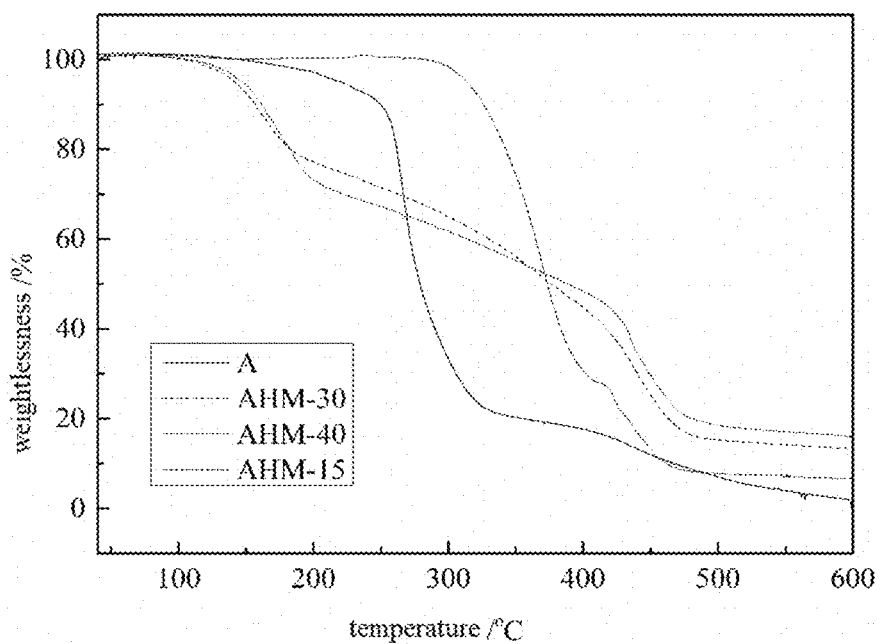
FIG. 1 is a TGA diagram of synthesized AHM thermoplastic elastomer particles at different temperatures.
Figure 2:
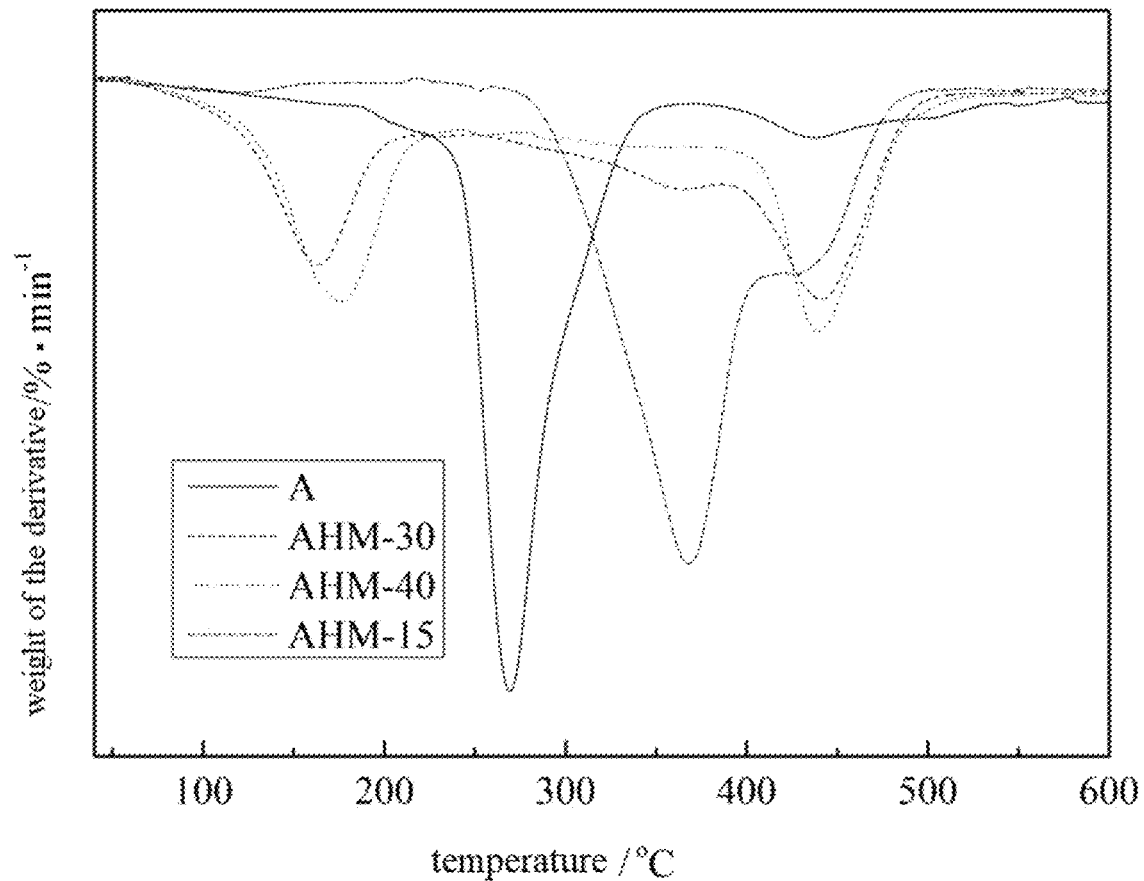
FIG. 2 is a DTG diagram of synthesized AHM thermoplastic elastomer particles at different temperatures.

3. Thermal Stability of the Thermoplastic Elastomer for Profile Control and Water Shutoff Provided by the Present Disclosure As shown in FIGS. 1-2, the thermal decomposition temperature ($T_d$=365° C.) of the thermoplastic elastomer of embodiment 2 modified at 15° C. is significantly higher than that of the raw material A ($T_d$ of A=268° C.), while the thermoplastic elastomer modified at 30° C. and 40° C. have larger particle size and different modification degrees, so the thermoplastic elastomer modified at different temperature have different appearance size and properties.

4. Mechanical Properties of the Thermoplastic Elastomer for Profile Control and Water Shutoff Provided by the Present Disclosure As shown in FIG. 3, the thermoplastic elastomer particles have good elasticity and flexibility by preliminary evaluation of artificial stretching. The thermoplastic elastomer of embodiment 1 after 87 h of high temperature high salt aging (130° C., 210,000 salinity), the thermoplastic elastomer of embodiment 2 after high temperature and high salt aging (120° C., 210,000 salinity), exhibit good elasticity and flexibility after melt bonding of the particles.

By preliminary evaluation of artificial stretching, the thermoplastic elastomer of embodiment 1 recovered to its original particle size after freeze drying and water absorption at 90° C., and still has good elasticity and flexibility when stretching.

The description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for preparing a thermoplastic elastomer for profile control and water shutoff, comprising:
   (1) weighing raw materials;
   (2) dividing the water into two parts, adding the component A into the first pan of water, heating and stirring to prepare a solution, and cooling;
   (3) dripping the strong acid into the cooled solution;
   (4) dripping a second part of water and a hydrophobic modifier to the solution in sequence, heating and stirring after the dripping to obtain the thermoplastic elastomer;
   wherein the raw materials comprise the following components by weight:
   8-10 parts of a component A,
   1-3 of a strong acid,
   1-3 parts of a hydrophobic modifier, and
   100-105 parts of water;
   the component A is one of a polyethylene glycol, a polyvinyl methyl ether, a polyvinyl alcohol and a copolymer of acrylamide and acrylonitrile;
   the strong acid is one of a concentrated hydrochloric acid and a concentrated sulfuric acid;
   the hydrophobic modifier is one of a formaldehyde, an acetaldehyde, a propionaldehyde, a butyraldehyde, a β-propiolactone, a γ-butyrolactone, a δ-valerolactone, methyltriacetylsilane, a methyltrimethylsilane, a butyl acrylate, and an ethylene glycol dimethacrylate.

2. The method for preparing the thermoplastic elastomer for profile control and water shutoff of claim 1, wherein the weight ratio of the first part of water to the second part of water is 25-75:1.

3. The method of claim 1, wherein in the step (2), the heating temperature is 90-100° C., the stirring rotation speed is 100-500 r/min, and a stirring time is 1-3 h.

4. The method of claim 1, wherein in the step (2), the solution is cooled to 20-40° C.

5. The method of claim 1, wherein in the step (3), the dripping speed of the strong acid is 5-10 s/drop.

6. The method of claim 1, wherein in the step (4), the heating temperature is 25-40° C., the stirring rotation speed is 500-1000 r/min, and the stirring time is 1-5 h.

7. The method of claim 1, wherein in the step (4), the second part of water and the hydrophobic modifier are dripped to the solution in sequence, and after the dripping, the solution is stirred at a temperature of 25° C. for 0-1 h, then heated to 30° C. and stirred for 0-1 h, and finally heated to 40° C. and stirred for 1-3 h to obtain the thermoplastic elastomer.

8. The method of claim 1, wherein in the step (4), the dripping speed of the second part of water is 5-15 s/drop; and the dripping speed of the hydrophobic modifier is 5-15 s/drop.

* * * * *